United States Patent
Bar-El et al.

(10) Patent No.: US 7,613,235 B2
(45) Date of Patent: Nov. 3, 2009

(54) HITLESS MODEM POOL EXPANSION AT STEADY STATE

(75) Inventors: Maya Bar-El, Hod-Hasharon (IL); Zeev Litichever, Rehovot (IL)

(73) Assignee: Actelis Networks Israel Ltd., Petach Tikvah (IL)

( * ) Notice: Subject to any disclaimer, the term of this patent is extended or adjusted under 35 U.S.C. 154(b) by 379 days.

(21) Appl. No.: 10/582,091

(22) PCT Filed: Dec. 11, 2003

(86) PCT No.: PCT/IL03/01064

§ 371 (c)(1),
(2), (4) Date: Mar. 1, 2007

(87) PCT Pub. No.: WO2005/057806

PCT Pub. Date: Jun. 23, 2005

(65) Prior Publication Data

US 2007/0217489 A1    Sep. 20, 2007

(51) Int. Cl.
*H04B 1/38* (2006.01)
(52) U.S. Cl. .................................... 375/222
(58) Field of Classification Search ............ 375/222, 375/254, 255, 296, 224, 285; 379/1.01, 1.03, 379/296, 406.05, 417; 370/201
See application file for complete search history.

(56) References Cited

U.S. PATENT DOCUMENTS

| 5,970,088 | A | 10/1999 | Chen |
| 7,027,537 | B1 * | 4/2006 | Cheong et al. ............... 375/348 |
| 7,187,711 | B1 * | 3/2007 | Kantschuk et al. .......... 375/222 |
| 2003/0137925 | A1 | 7/2003 | Zamir |

* cited by examiner

*Primary Examiner*—Khai Tran
(74) *Attorney, Agent, or Firm*—Pearl Cohen Zedek Latzer, LLP

(57) ABSTRACT

In a communications system having a first modem transmitting via a communications channel, a method for adding a second modem, the method including learning crosstalk caused by transmissions from the first modem to the second modem while the second modem is in a transmitting state insufficient to cause crosstalk interference to the first modem in accordance with a predefined measure, deriving from the learned crosstalk an estimation of crosstalk that would be caused by the second modem to the first modem when the second modem is in a transmitting state, configuring the first modem to cancel crosstalk according to the crosstalk estimation, causing the second modem to enter a transmitting state sufficient to cause crosstalk interference to the first modem in accordance with a predefined measure, and causing the first modem to at least partially cancel crosstalk caused by the second modem in accordance with the crosstalk estimation.

24 Claims, 4 Drawing Sheets

HITLESS MODEM POOL EXPANSION AT STEADY STATE

This application is a U.S. National Phase Application under 35 U.S.C. 371 of PCT International Application No. PCT/IL2003/001064, which has an international filing date of Dec. 11, 2003, and is incorporated herein by reference in its entirety.

FIELD OF THE INVENTION

The present invention relates to modem pools in general, and more particularly to hitless modem pool expansion.

BACKGROUND OF THE INVENTION

Crosstalk interference between the receiving and the transmitting paths of different transceivers whose communications media are in physical proximity to one another, such as is often experienced between different wires in a telephone wire bundle, is well known. The crosstalk in a telephone wire bundle depends on the number of interfering lines, and increases as the bandwidth that the signals occupy increases. In a modem pool environment where streams of data are distributed to many lines within a single bundle, and where the bundle is used exclusively by the modem pool, the crosstalk that the receivers need to overcome is mainly generated by the transmissions that the modem pool itself generates. Since such a system has access to its own transmission characteristics, such information may be used to cancel the interference that leaks into the receivers, thus decreasing the noise floor of each receiver.

In classic crosstalk cancellation, a transmitter transmitting via one wire or wire grouping (e.g., twisted pair) affects the receiver receiving via another wire or wire grouping. A hybrid circuit separates the received signal from the transmitted interfering signal, but since the hybrid cannot completely separate the transmit path from the receive path, some of the transmitted signal leaks into the receiver and becomes an interfering signal. A canceller then filters out the effect of the interfering signal, resulting in a "cleaned" received signal. For a single modem, this problem may be addressed using classic echo cancellation techniques. In a modem pool environment where several modems transmit via a shared bundle, the canceller for each receiver must take into account all the interfering transmitters.

The addition of a modem to a modem pool that is operating at steady state may cause a significant increase in the noise levels experienced by the currently-operating modems, since the crosstalk generated by the currently-operating modems is already being cancelled, while the crosstalk interference that the new modem causes to the currently-operating modems is not cancelled until its crosstalk function is learned by the currently-operating modems. Until the currently-operating modems learn the crosstalk function of the new modem, the crosstalk generated by the new modem may cause severe degradation in the reception quality of the currently-operating modems, increasing their bit error rate (BER), and possibly causing some currently-operating modems to lose synchronization and deactivate as a result.

The "hitless" addition of a new modem to a modem pool operating at steady state that does not significantly affect the existing noise environment of the modem pool would therefore be advantageous.

SUMMARY OF THE INVENTION

The present invention provides for the "hitless" addition of a modem to a modem pool operating at steady state—"hitless" in that the crosstalk interference of the added modem has little or no negative effect on the currently-operating modems in the modem pool. In the present invention a new modem is inserted into the modem pool but is not immediately used for transmitting data. Instead, it is used to learn the crosstalk it receives from the other currently-operating modems in the modem pool. Due to the reciprocal nature of crosstalk in this arrangement, this information may be used to determine the crosstalk that the new modem will cause to the other modems. The modems in the modem pool may thus be informed of the crosstalk that the new modem will cause once it begins to transmit data, and they may adjust themselves to compensate for the additional crosstalk as soon the new modem begins to transmit.

In one aspect of the present invention in a communications system having a first modem transmitting via a communications channel, a method is provided for adding a second modem for communication via the communications channel, the method including configuring the second modem for receiving communications via the communications channel, learning crosstalk caused by transmissions from the first modem via the communications channel to the second modem while the second modem is in a transmitting state insufficient to cause crosstalk interference to the first modem in accordance with a predefined measure, deriving from the learned crosstalk an estimation of crosstalk that would be caused by the second modem to the first modem when the second modem is in a transmitting state, configuring the first modem to cancel crosstalk according to the crosstalk estimation, causing the second modem to enter a transmitting state sufficient to cause crosstalk interference to the first modem in accordance with a predefined measure, and causing the first modem to at least partially cancel crosstalk caused by the second modem in accordance with the crosstalk estimation.

In another aspect of the present invention the learning step includes learning by applying crosstalk cancellation to transmissions received by the second modem at a receiver of the second modem.

In another aspect of the present invention the learning step includes expressing the learned crosstalk as a transfer function.

In another aspect of the present invention the learning step includes learning while the second modem is in a non-transmitting state In another aspect of the present invention the deriving step includes applying an adjustment to the crosstalk estimation to compensate for a difference in a characteristic of the transmissions.

In another aspect of the present invention the deriving step includes deriving the estimation from a reciprocal value of the learned crosstalk.

In another aspect of the present invention in a communications system having a modem pool for communicating via a communications channel, the modem pool having a plurality of modems, a method is provided for modem pool expansion including adding a new modem into the modem pool, where the new modem is operative to communicate via the communications channel, learning crosstalk caused by transmissions from any of the plurality of modems via the communications channel to the added modem while the added modem is in a transmitting state insufficient to cause crosstalk interference to any of the plurality of modems in accordance with a predefined measure, deriving from the learned crosstalk an estimation of crosstalk that would be caused by the added modem to any of the plurality of modems when the added modem is in a transmitting state, configuring any of the plurality of modems to cancel crosstalk according to the crosstalk estimation, causing the added modem to enter a transmitting state sufficient to cause crosstalk interference to any of the plurality of modems in accordance with a predefined measure, and causing any of the plurality of modems to at least partially cancel crosstalk caused by the added modem in accordance with the crosstalk estimation.

In another aspect of the present invention the learning step includes learning by applying crosstalk cancellation to transmissions received by the new modem at a receiver of the new modem.

In another aspect of the present invention the learning step includes expressing the learned crosstalk as a transfer function.

In another aspect of the present invention the learning step includes learning while the added modem is in a non-transmitting state In another aspect of the present invention the deriving step includes applying an adjustment to the crosstalk estimation to compensate for a difference in a characteristic of the transmissions.

In another aspect of the present invention the deriving step includes deriving the estimation from a reciprocal value of the learned crosstalk.

In another aspect of the present invention a communications system is provided having a first modem transmitting via a communications channel, and a second modem for communication via the communications channel, the system including means for configuring the second modem for receiving communications via the communications channel, means for learning crosstalk caused by transmissions from the first modem via the communications channel to the second modem while the second modem is in a transmitting state insufficient to cause crosstalk interference to the first modem in accordance with a predefined measure, means for deriving from the learned crosstalk an estimation of crosstalk that would be caused by the second modem to the first modem when the second modem is in a transmitting state, means for configuring the first modem to cancel crosstalk according to the crosstalk estimation, means for causing the second modem to enter a transmitting state sufficient to cause crosstalk interference to the first modem in accordance with a predefined measure, and means for causing the first modem to at least partially cancel crosstalk caused by the second modem in accordance with the crosstalk estimation.

In another aspect of the present invention the means for learning is operative to learn by applying crosstalk cancellation to transmissions received by the second modem at a receiver of the second modem.

In another aspect of the present invention the means for learning is operative to express the learned crosstalk as a transfer function.

In another aspect of the present invention the means for learning is operative to learn while the second modem is in a non-transmitting state In another aspect of the present invention the means for deriving is operative to apply an adjustment to the crosstalk estimation to compensate for a difference in a characteristic of the transmissions.

In another aspect of the present invention the means for deriving is operative to derive the estimation from a reciprocal value of the learned crosstalk.

In another aspect of the present invention a communications system is provided having a modem pool for communicating via a communications channel, the modem pool having a plurality of modems, the system including means for adding a new modem into the modem pool, where the new modem is operative to communicate via the communications channel, means for learning crosstalk caused by transmissions from any of the plurality of modems via the communications channel to the added modem while the added modem is in a transmitting state insufficient to cause crosstalk interference to any of the plurality of modems in accordance with a predefined measure, means for deriving from the learned crosstalk an estimation of crosstalk that would be caused by the added modem to any of the plurality of modems when the added modem is in a transmitting state, means for configuring any of the plurality of modems to cancel crosstalk according to the crosstalk estimation, means for causing the added modem to enter a transmitting state sufficient to cause crosstalk interference to any of the plurality of modems in accordance with a predefined measure, and means for causing any of the plurality of modems to at least partially cancel crosstalk caused by the added modem in accordance with the crosstalk estimation.

In another aspect of the present invention the means for learning is operative to learn by applying crosstalk cancellation to transmissions received by the new modem at a receiver of the new modem.

In another aspect of the present invention the means for learning is operative to express the learned crosstalk as a transfer function.

In another aspect of the present invention the means for learning is operative to learn while the added modem is in a non-transmitting state In another aspect of the present invention the means for deriving is operative to apply an adjustment to the crosstalk estimation to compensate for a difference in a characteristic of the transmissions.

In another aspect of the present invention the means for deriving is operative to derive the estimation from a reciprocal value of the learned crosstalk.

DETAILED DESCRIPTION OF PREFERRED EMBODIMENTS

Figure 1:
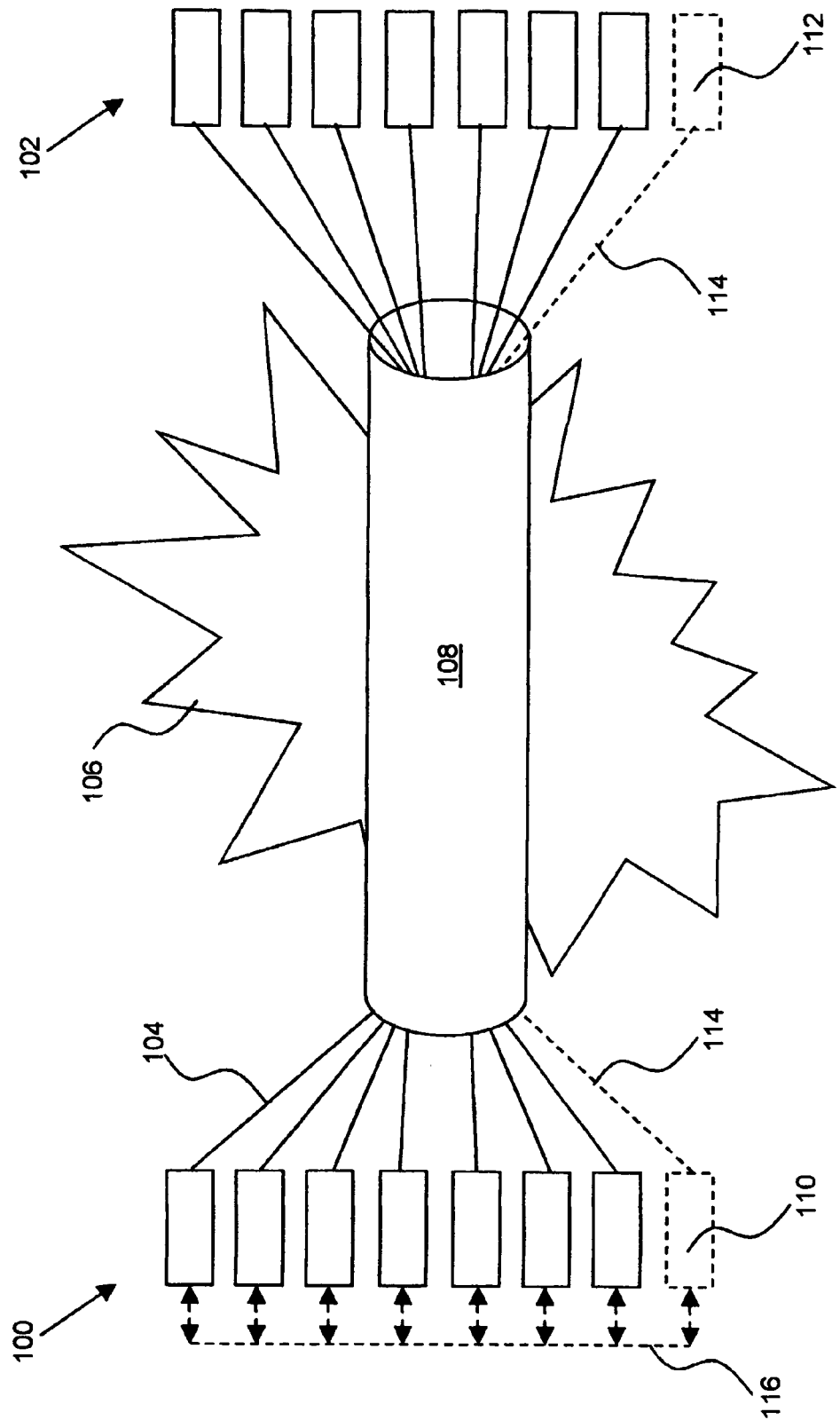
FIG. 1 is a simplified pictorial illustration of a modem pool arrangement useful in understanding the present invention.

Reference is now made to FIG. 1 which is a simplified pictorial illustration of a modem pool arrangement useful in understanding the present invention. A modem pool, generally referenced 100, and comprising a plurality of individual modems is seen in communication with a modem pool, generally referenced 102, via a plurality of connections 104 over a telephone network 106. Connections 104 are typically copper wire pairs arranged in one or more bundles 108. The modem pools preferably operate in a coordinated manner using conventional techniques, such as is described in U.S. patent application Ser. No. 09/510,550 filed Feb. 22, 2000, and entitled "High Speed Access System Over Copper Cable Plant." The interference on each connection 104, the attenuation coefficients of the crosstalk between connections 104, the attenuation of each connection 104 from end to end, as well as the bit error rate (BER) of each connection 104 may be measured using conventional techniques, and any of this information may be communicated to any of the modems shown, including via connections other than connections 104, such as via a back channel 116.

The addition of a new modem pair 110, 112 communicating via a connection 114 in bundle 108 will typically introduce crosstalk interference to the connections 104, degrading the signals sent and received by modems 100 and 102.

Figure 2:
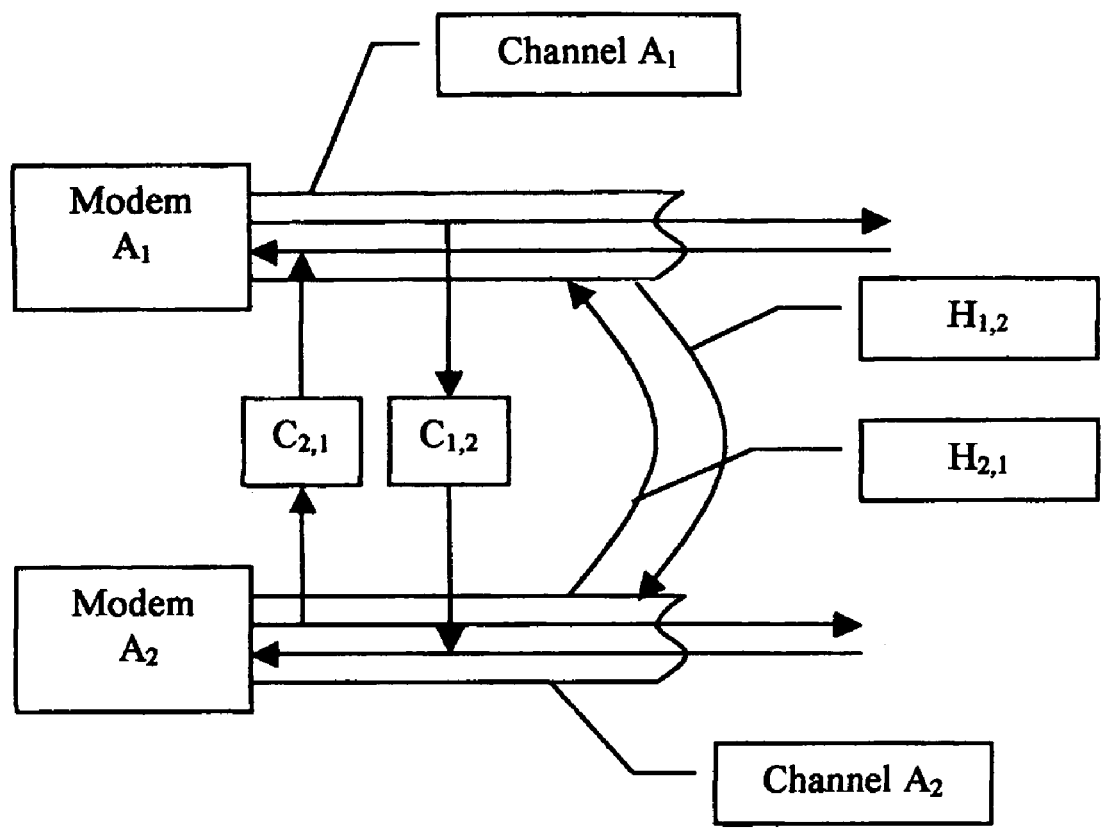
FIG. 2 which is a simplified pictorial illustration of elements of a modem pool arrangement useful in understanding the present invention.

Reference is now made to FIG. 2 which is a simplified pictorial illustration of elements of a modem pool arrangement useful in understanding the present invention. In FIG. 2, two modems $A_1$ and $A_2$ of one side of a modem pool are shown. As in FIG. 1, modems $A_1$ and $A_2$ communicate via separate channels $L_1$ and $L_2$, respectively, of a shared communications medium (not shown), such as a telephone wire bundle, and, as such, have a crosstalk effect on each other. The crosstalk effect that modem $A_1$ has on channel $L_2$ and, as a result, on transmissions received by modem $A_2$, is shown as $H_{1,2}$, while the crosstalk effect that modem $A_2$ has on channel $L_1$ and modem $A_1$, is shown as $H_{2,1}$. $H_{1,2}$ and $H_{2,1}$ are typically expressed as linear transfer functions. According to the reciprocity principle, $H_{1,2}$ and $H_{2,1}$ are symmetrical, and thus $H_{1,2}$ may be derived from $H_{2,1}$, and vice versa. A crosstalk canceller $C_{2,1}$ typically being an adaptive filter, is shown, which models the crosstalk of $H_{2,1}$ using conventional techniques and communicates this information to modem $A_1$. Modem $A_1$ may then use this information to compensate for the crosstalk it experiences from modem $A_2$ using conventional techniques. Similarly, a crosstalk canceller $C_{1,2}$ is shown, which models the crosstalk of $H_{1,2}$ communicates this information to modem $A_2$ which compensates for the crosstalk it experiences from modem $A_1$.

Figure 3:
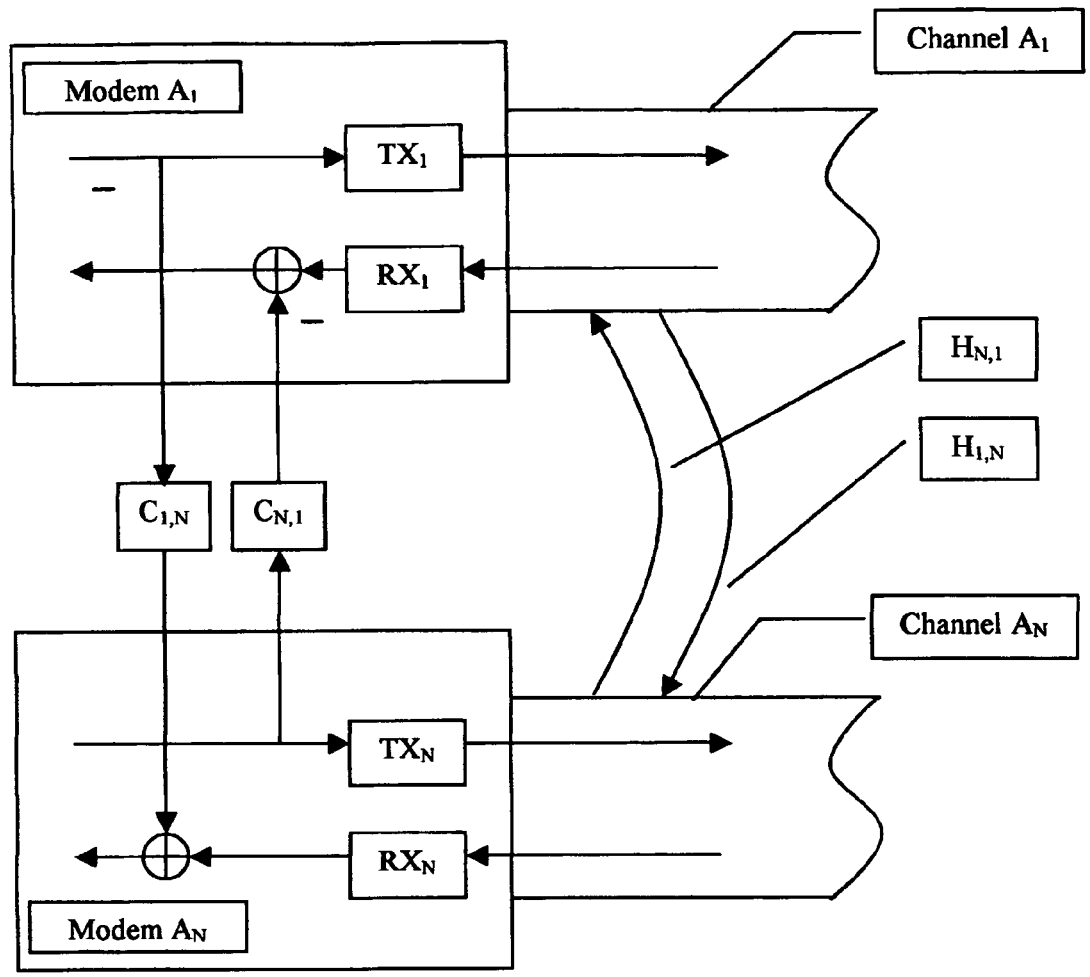
FIG. 3 which is a simplified pictorial illustration of a modem pool arrangement with hitless modem expansion, constructed and operative in accordance with a preferred embodiment of the present invention.

Reference is now made to FIG. 3 which is a simplified pictorial illustration of a modem pool arrangement with hitless modem expansion, constructed and operative in accordance with a preferred embodiment of the present invention. In the present invention, when a modem $A_N$ is added to a modem pool, and either before modem $A_N$ begins to transmit a signal at all or before modem $A_N$ begins to transmit a signal sufficiently strong enough to degrade the performance of any of the modems in the modem pool in accordance with a predefined measure, a modem $A_1$ in the modem pool learns the crosstalk $C_{N,1}$ that modem $A_N$ will cause to signals received by modem $A_1$ once $A_N$ begins transmitting normally. To accomplish this, in FIG. 3 a signal transmitted by modem $A_1$ is sampled within modem $A_1$ by a crosstalk canceller $C_{1,N}$. A transformator $TX_1$ then preferably performs a transformation upon the signal, such as by applying conventional transmission filters, and the signal is transmitted on channel $L_1$, being the ordinary path of the transmission signal. The crosstalk caused by modem $A_1$ to channel $L_N$ of modem $A_N$ is received by the receiver of $A_N$, which may perform a transformation $RX_N$ on the crosstalk received. Crosstalk canceller $C_{1,N}$ then models the concatenation of the coupling of $TX_N$, $H_{1,N}$ and $RX_N$. Due to the reciprocal nature of crosstalk between modems in a modem pool, the crosstalk information learned by $C_{1,N}$ may be used to generate a crosstalk canceller $C_{N,1}$ This is preferably accomplished by multiplying $C_{1,N}$ by the ratio $(TX_N*RX_1)/(TX_1*RX_N)$. $C_{N,1}$ may then be used to eliminate crosstalk that modem $A_N$ will cause to signals received by modem $A_1$ once $A_N$ begins transmitting a signal at full power or at a power level sufficient to cause crosstalk interference to modem $A_1$ in accordance with a predefined measure by modeling the concatenation of the coupling of $TX_N$, $H_{N,1}$ and $RX_1$.

In this manner, a different crosstalk canceller $C_{N,X}$ may learn the crosstalk caused by each modem $A_X$ in the modem pool to modem $A_N$ and provide the information to a crosstalk canceller $C_{X,N}$ for reciprocal cancellation of crosstalk caused by modem $A_N$ to modem $A_X$.

Figure 4:
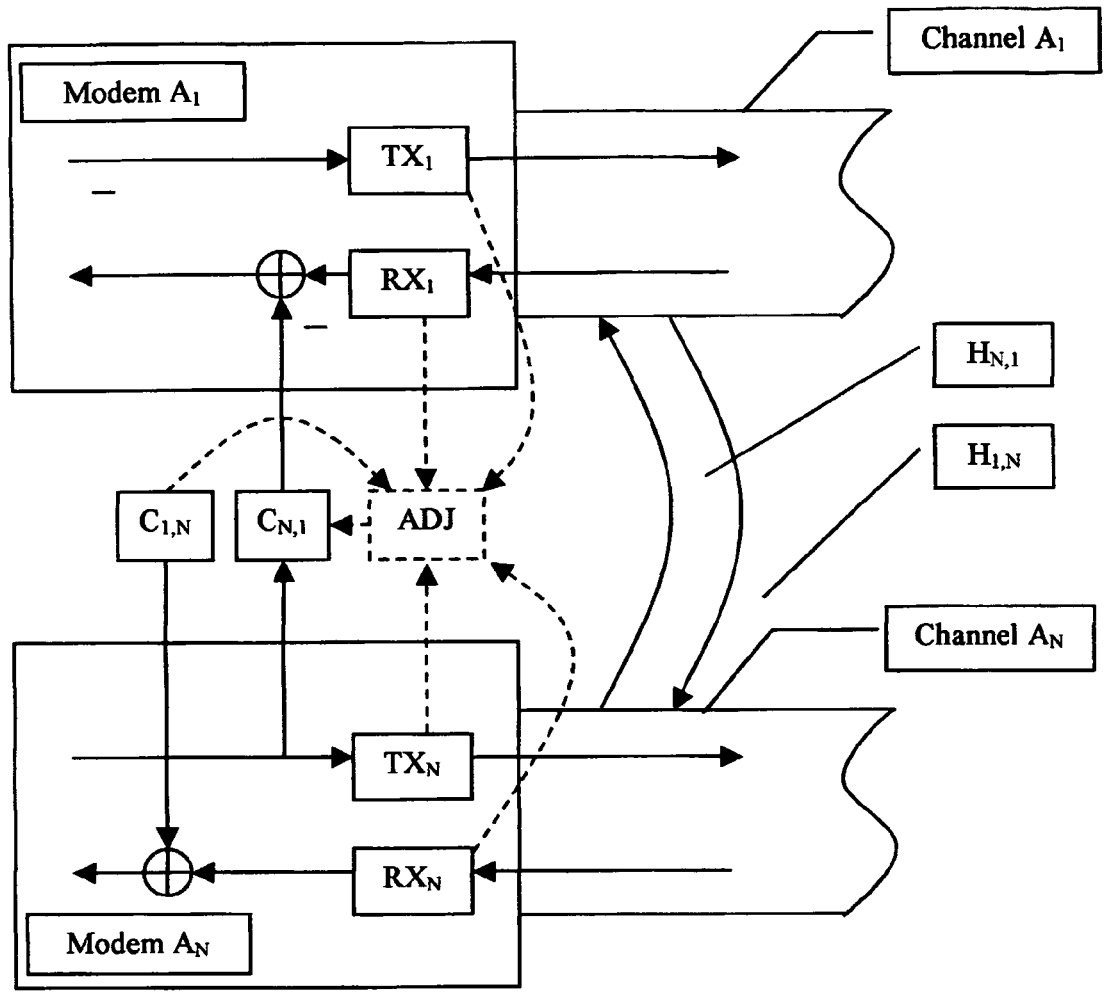
FIG. 4 which is a simplified pictorial illustration of a modem pool arrangement with hitless modem expansion including adjustment for different transmission characteristics, constructed and operative in accordance with a preferred embodiment of the present invention.

Reference is now made to FIG. 4, which is a simplified pictorial illustration of a modem pool arrangement with hitless modem expansion including adjustment for different transmission characteristics, constructed and operative in accordance with a preferred embodiment of the present invention. It is appreciated that the transmission mechanism $TX_1$ could differ from that of $TX_N$, and/or the reception mechanism $RX_1$ could differ from that of $RX_N$, having, for example, different gain or phase. Nevertheless, the linear part of the transfer functions $H_{1,N}$ and $H_{N,1}$ are expected to be identical.

Differences between $RX_1$ and $RX_N$ may occur for several reasons. For example, $RX_1$ might introduce a different delay into its received signal than might $RX_N$. To compensate for the different delays, an adjustment element ADJ may adjust the delay in the signal received at canceller $C_{N,1}$ using conventional techniques. The difference in delays may be measured for any two modems in the modem pool at any time. Where the modems are from different vendors and/or employ different technologies (e.g., SHDSL vs. ADSL), the receivers and transmitters of the modems may include filters which are substantially different from one another.

Differences in both gain and delay may also be compensated for by adjustment element ADJ, such as where $C_{1,N}$ is a discretization of a continuous time filter $C_1(t)$, and $C_{N,1}$ is a discretization of a continuous time filter $C_2(t)$, which are related by the equation: $C_1(t)=g*C_2(t+d)$, where g and d are gain and delay factors respectively. To compensate, g and d may be estimated in advance, allowing $C_{N,1}$ to be computed from g, and d, and $C_{1,N}$, using any conventional interpolation methods.

In another example of compensating for the effect of different transmission and reception mechanisms (e.g., $TX_1$ and $RX_N$), the combinations of crosstalk cancellation filters $C_{i,j}$ for each combination of $TX_i$ and $RX_j$ may be determined prior to activation of the modem pool. As the ratio of the transfer function of any two filters $C_{i,j}/C_{j,i}$ reflects the difference between the two TX mechanisms and the two RX mechanisms, this ratio may be expected to be the same for the crosstalk coupling measured prior to activation of the modem pool and the crosstalk coupling at steady state. Thus, the ratio $C_{i,j}/C_{j,i}$ measured prior to activation can be used by adjustment element ADJ at steady state to compute $C_{j,i}$ from $C_{i,j}$ multiplying $C_{i,j}$ by $C_{j,i}/C_{i,j}$.

In another method, the transfer functions of RX and TX are measured separately for each TX device and each RX device directly using a network analyzer. These functions may then be used by adjustment element ADJ to compute $C_{j,i}$ from $C_{i,j}$ by multiplying $C_{i,j}$ by the ratio $(TX_j*RX_i)/(TX_i*RX_j)$.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. In a communications system having a first modem transmitting via a communications channel, a method for adding a second modem for communication via said communications channel, the method comprising:
   configuring said second modem for receiving communications via said communications channel;
   learning crosstalk caused by transmissions from said first modem via said communications channel to said second modem while said second modem is in a transmitting state insufficient to cause crosstalk interference to said first modem in accordance with a predefined measure;
   deriving from said learned crosstalk an estimation of crosstalk that would be caused by said second modem to said first modem when said second modem is in a transmitting state;
   configuring said first modem to cancel crosstalk according to said crosstalk estimation;
   causing said second modem to enter a transmitting state sufficient to cause crosstalk interference to said first modem in accordance with a predefined measure; and
   causing said first modem to at least partially cancel crosstalk caused by said second modem in accordance with said crosstalk estimation.

2. A method according to claim 1 wherein said learning step comprises learning by applying crosstalk cancellation to transmissions received by said second modem at a receiver of said second modem.

3. A method according to claim 1 wherein said learning step comprises expressing said learned crosstalk as a transfer function.

4. A method according to claim 1 wherein said learning step comprises learning while said second modem is in a non-transmitting state.

5. A method according to claim 1 wherein said deriving step comprises applying an adjustment to said crosstalk estimation to compensate for a difference in a characteristic of said transmissions.

6. A method according to claim 1 wherein said deriving step comprises deriving said estimation from a reciprocal value of said learned crosstalk.

7. In a communications system having a modem pool for communicating via a communications channel, the modem pool having a plurality of modems, a method for modem pool expansion comprising:
   adding a new modem into said modem pool, wherein said new modem is operative to communicate via said communications channel;
   learning crosstalk caused by transmissions from any of said plurality of modems via said communications channel to said added modem while said added modem is in a transmitting state insufficient to cause crosstalk interference to any of said plurality of modems in accordance with a predefined measure;
   deriving from said learned crosstalk an estimation of crosstalk that would be caused by said added modem to any of said plurality of modems when said added modem is in a transmitting state;
   configuring any of said plurality of modems to cancel crosstalk according to said crosstalk estimation;
   causing said added modem to enter a transmitting state sufficient to cause crosstalk interference to any of said plurality of modems in accordance with a predefined measure; and
   causing any of said plurality of modems to at least partially cancel crosstalk caused by said added modem in accordance with said crosstalk estimation.

8. A method according to claim 7 wherein said learning step comprises learning by applying crosstalk cancellation to transmissions received by said new modem at a receiver of said new modem.

9. A method according to claim 7 wherein said learning step comprises expressing said learned crosstalk as a transfer function.

10. A method according to claim 7 wherein said learning step comprises learning while said added modem is in a non-transmitting state.

11. A method according to claim 7 wherein said deriving step comprises applying an adjustment to said crosstalk estimation to compensate for a difference in a characteristic of said transmissions.

12. A method according to claim 7 wherein said deriving step comprises deriving said estimation from a reciprocal value of said learned crosstalk.

13. A communications system having a first modem transmitting via a communications channel, and a second modem for communication via said communications channel, the system comprising:
   means for configuring said second modem for receiving communications via said communications channel;
   means for learning crosstalk caused by transmissions from said first modem via said communications channel to said second modem while said second modem is in a transmitting state insufficient to cause crosstalk interference to said first modem in accordance with a predefined measure;
   means for deriving from said learned crosstalk an estimation of crosstalk that would be caused by said second modem to said first modem when said second modem is in a transmitting state;
   means for configuring said first modem to cancel crosstalk according to said crosstalk estimation;
   means for causing said second modem to enter a transmitting state sufficient to cause crosstalk interference to said first modem in accordance with a predefined measure; and
   means for causing said first modem to at least partially cancel crosstalk caused by said second modem in accordance with said crosstalk estimation.

14. A system according to claim 13 wherein said means for learning is operative to learn by applying crosstalk cancellation to transmissions received by said second modem at a receiver of said second modem.

15. A system according to claim 13 wherein said means for learning is operative to express said learned crosstalk as a transfer function.

16. A system according to claim 13 wherein said means for learning is operative to learn while said second modem is in a non-transmitting state.

17. A system according to claim 13 wherein said means for deriving is operative to apply an adjustment to said crosstalk estimation to compensate for a difference in a characteristic of said transmissions.

18. A system according to claim 13 wherein said means for deriving is operative to derive said estimation from a reciprocal value of said learned crosstalk.

19. A communications system having a modem pool for communicating via a communications channel, the modem pool having a plurality of modems, the system comprising:
- means for adding a new modem into said modem pool wherein said new modem is operative to communicate via said communications channel;
- means for learning crosstalk caused by transmissions from any of said plurality of modems via said communications channel to said added modem while said added modem is in a transmitting state insufficient to cause crosstalk interference to any of said plurality of modems in accordance with a predefined measure;
- means for deriving from said learned crosstalk an estimation of crosstalk that would be caused by said added modem to any of said plurality of modems when said added modem is in a transmitting state;
- means for configuring any of said plurality of modems to cancel crosstalk according to said crosstalk estimation;
- means for causing said added modem to enter a transmitting state sufficient to cause crosstalk interference to any of said plurality of modems in accordance with a predefined measure; and
- means for causing any of said plurality of modems to at least partially cancel crosstalk caused by said added modem in accordance with said crosstalk estimation.

20. A system according to claim 19 wherein said means for learning is operative to learn by applying crosstalk cancellation to transmissions received by said new modem at a receiver of said new modem.

21. A system according to claim 19 wherein said means for learning is operative to express said learned crosstalk as a transfer function.

22. A system according to claim 19 wherein said means for learning is operative to learn while said added modem is in a non-transmitting state.

23. A system according to claim 19 wherein said means for deriving is operative to apply an adjustment to said crosstalk estimation to compensate for a difference in a characteristic of said transmissions.

24. A system according to claim 19 wherein said means for deriving is operative to derive said estimation from a reciprocal value of said learned crosstalk.

* * * * *

UNITED STATES PATENT AND TRADEMARK OFFICE
CERTIFICATE OF CORRECTION

PATENT NO.       : 7,613,235 B2
APPLICATION NO.  : 10/582091
DATED            : November 3, 2009
INVENTOR(S)      : Bar-El et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 509 days.

Signed and Sealed this

Nineteenth Day of October, 2010

David J. Kappos
*Director of the United States Patent and Trademark Office*